(12) United States Patent
Kramm et al.

(10) Patent No.: US 9,033,299 B2
(45) Date of Patent: May 19, 2015

(54) VEHICLE SEAT, IN PARTICULAR AUTOMOBILE SEAT

(75) Inventors: Lars Kramm, Trippstadt (DE); Thomas Haessel, Haschbach (DE)

(73) Assignee: KEIPER GmbH & CO. KG, Kaiserlautern (DE)

( * ) Notice: Subject to any disclaimer, the term of this patent is extended or adjusted under 35 U.S.C. 154(b) by 0 days.

(21) Appl. No.: 14/131,540

(22) PCT Filed: Jun. 29, 2012

(86) PCT No.: PCT/EP2012/002767
§ 371 (c)(1),
(2), (4) Date: Jan. 8, 2014

(87) PCT Pub. No.: WO2013/013757
PCT Pub. Date: Jan. 31, 2013

(65) Prior Publication Data
US 2014/0138996 A1 May 22, 2014

(30) Foreign Application Priority Data
Jul. 25, 2011 (DE) .......................... 10 2011 108 652

(51) Int. Cl.
*F16M 13/00* (2006.01)
*B60N 2/08* (2006.01)
*B60N 2/07* (2006.01)

(52) U.S. Cl.
CPC ............ *B60N 2/0881* (2013.01); *B60N 2/0705* (2013.01); *B60N 2/0806* (2013.01); *B60N 2/0875* (2013.01)

(58) Field of Classification Search
USPC ................................. 248/424, 429; 297/344.1
See application file for complete search history.

(56) References Cited

U.S. PATENT DOCUMENTS

| | | | | | |
|---|---|---|---|---|---|
| 5,352,019 | A | * | 10/1994 | Bauer et al. .................... | 297/341 |
| 6,505,805 | B2 | * | 1/2003 | Fuller ........................... | 248/429 |
| 2004/0026975 | A1 | * | 2/2004 | Rausch et al. ............. | 297/344.1 |
| 2004/0164600 | A1 | * | 8/2004 | Rausch et al. ............. | 297/344.1 |
| 2011/0240820 | A1 | * | 10/2011 | Napau et al. .................. | 248/429 |

FOREIGN PATENT DOCUMENTS

| | | |
|---|---|---|
| DE | 203 18 787 U1 | 5/2005 |
| DE | 10 2008 060 824 A1 | 6/2010 |

(Continued)

OTHER PUBLICATIONS

Translation of International Preliminary Report on Patentability received in PCT/EP2012/002767.

(Continued)

*Primary Examiner* — Steven Marsh
(74) *Attorney, Agent, or Firm* — Foley & Lardner LLP

(57) ABSTRACT

A vehicle seat has a longitudinal adjuster, a pair of seat rails, a releasable latching device having at least one actuating pin that projects over the second seat rail, a pivotably arranged actuating lever, and a Bowden cable. A holder is fixed on a rail and supports the actuating lever such as to be pivotable about a pivot axis at one end, and a contact surface is formed on the actuating lever, on which surface the core of the Bowden cable rests in a subarea between the end of the sheath and the end of the core. The holder secures the end of the core of the Bowden cable, and the actuating lever has a Bowden cable support on which the sheath of the Bowden cable is supported directly or indirectly.

9 Claims, 3 Drawing Sheets

(56) References Cited

FOREIGN PATENT DOCUMENTS

Figure 1:
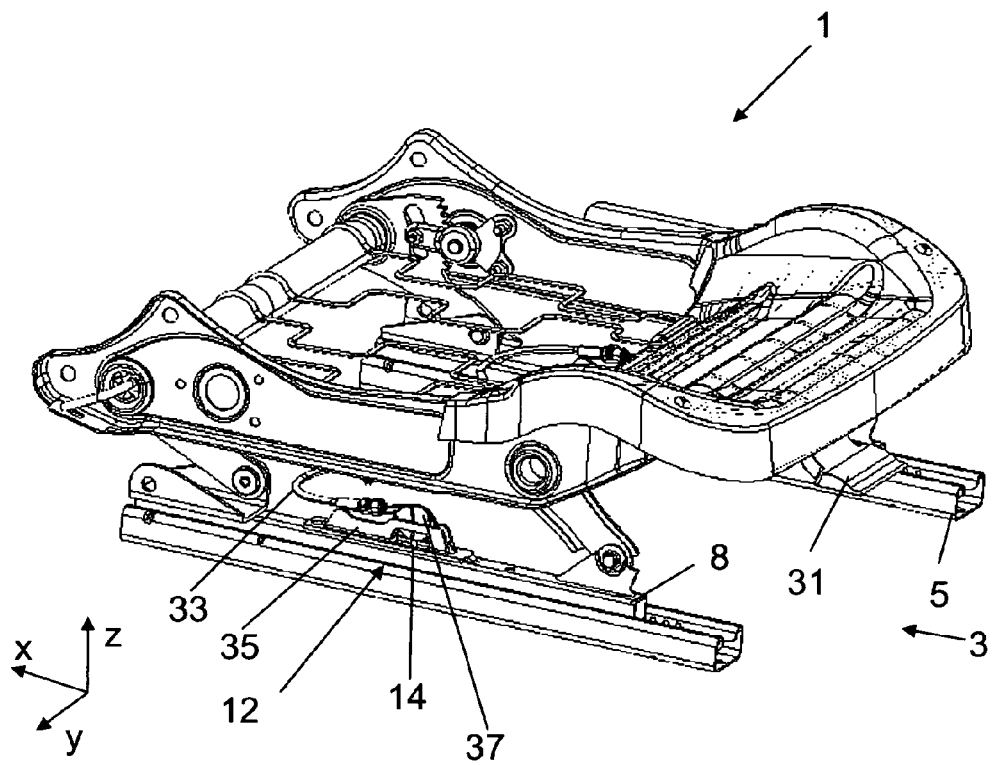

| | | |
|---|---|---|
| DE | 10 2009 010 226 A1 | 8/2010 |
| DE | 10 2007 062 635 B4 | 2/2011 |
| WO | WO-2010/051903 A1 | 5/2010 |

OTHER PUBLICATIONS

International Search Report mailed Oct. 2, 2012, as received in corresponding International Application No. PCT/EP2012/002767.

\* cited by examiner

VEHICLE SEAT, IN PARTICULAR AUTOMOBILE SEAT

CROSS REFERENCE TO RELATED APPLICATIONS

The present application is a U.S. National Stage of International Application No. PCT/EP2012/002767 filed on Jun. 29, 2012, which claims the benefit of German Patent Application No. 10 2011 108 652.1 filed on Jul. 25, 2011, the entire disclosures of all of which are incorporated herein by reference.

The invention relates to a vehicle seat, in particular a motor vehicle seat, having the features of the preamble of claim 1.

PRIOR ART

DE 10 2007 062 635 B4 discloses a vehicle seat having a seat cushion, a seat frame which carries the seat cushion, a longitudinal adjuster which can be actuated in order to longitudinally adjust the vehicle seat, and a height adjuster in order to adjust the height of the seat cushion relative to the longitudinal adjuster. At the front end of the seat cushion or at the front end of the seat frame, there is arranged an unlocking element which is operationally connected to the longitudinal adjuster in order to manually actuate it. The operational connection can be produced by means of a Bowden cable, whose core is directly connected to one end of a pivotably supported lever and cooperates therewith by means of transmission of a tensile force. In this instance, the lever pivots when the unlocking element is pulled and cooperates with the other end from above on a protruding actuation pin of a seat rail locking device, as disclosed in terms of principle, for example, in WO 2010 051 903 A1. In this instance, the pivot axis of the lever is arranged between the two ends of the lever.

Such an arrangement still leaves something to be desired.

DE 203 18 787 U1 discloses an actuation device for a motor vehicle seat, which has an actuation lever, which can be pivoted by means of a Bowden cable. The core of the Bowden cable is secured to the actuation lever in this instance. If the actuation lever is acted on by the Bowden cable, it is subjected to a rotation about a horizontally extending axis and consequently actuates the locking device indirectly via a lever.

Actuation devices which function in a similar manner are disclosed in DE 10 2009 010 226 A1 and in DE 10 2008 060 824 A1.

Problem

An object of the invention is to improve a vehicle seat, in particular a motor vehicle seat, of the type mentioned in the introduction.

Solution

This object is achieved according to the invention by a vehicle seat having the features mentioned in claim 1. The dependent claims relate to advantageous embodiments, which can be used individually or in combination with each other.

According to the invention there is provided in this instance a vehicle seat, in particular a motor vehicle seat, having a longitudinal adjuster and having a seat rail pair having a first seat rail which is secured to a structure, a second seat rail which is guided in this first seat rail in the longitudinal direction of the seat and which is connected to the vehicle seat, having a releasable locking device having at least one actuation pin which protrudes at least in one position beyond the second seat rail, having a pivotably arranged actuation lever, having a Bowden cable having a sheath and a core, wherein there is provided a retention member which is secured to a rail and which supports the actuation lever at one end so as to be able to be pivoted about a pivot axis, and wherein there is formed on the actuation lever an abutment face with which the core of the Bowden cable is in abutment in a part-region between the end of the sheath and the end of the core, and wherein the retention member which is secured to a rail secures the end of the core of the Bowden cable, and wherein the actuation lever has a Bowden cable support, on which the sheath of the Bowden cable is directly or indirectly supported.

The suspension of the core at the end of the retention member and the abutment of the core against the abutment face brings about a simple assembly of the Bowden cable. Furthermore, as a result of this arrangement of the Bowden cable, the bearing location of the actuation lever on the retention member is loaded to a lesser extent.

The retention member and/or the actuation lever is preferably formed by a plastics component. This enables weight and cost savings.

The abutment face of the actuation lever is preferably formed by a groove. The groove ensures precise guiding of the core, the core automatically coming to rest in the groove so that no precise positioning by hand is required.

There is preferably provided on the Bowden cable a longitudinal compensation device which is arranged between the sheath and the Bowden cable support. The arrangement of the longitudinal compensation device of the Bowden cable at this end allows a simple fitting of the Bowden cable and simple longitudinal compensation, in particular in order to compensate for tolerances.

The Bowden cable can be fitted to the Bowden cable support of the actuation lever in a particularly simple manner by means of a clip. This enables very simple assembly of the Bowden cable.

The retention member preferably has two lateral guides, between which the actuation lever is positioned and in relation to which it can be moved in a relative manner by being pivoted about the pivot axis.

In particular, there is preferably provided laterally on the actuation lever at least one rib which is in abutment with the corresponding lateral guide. A plurality of ribs may also be provided, in particular also at both sides of the actuation lever. The ribs additionally increase the rigidity of the actuation lever and enable a weight reduction.

The rib is preferably arranged concentrically relative to the pivot axis, the rib both being able to slide along a face and also being able to be guided in a guiding groove for additional guiding.

The actuation lever is preferably pivotably supported on a shaft. The shaft is preferably provided or constructed on the retention member and extends in the transverse direction between two lateral guides, which are formed by lateral faces of the retention member.

In particular, a shaft-side end of the actuation lever is preferably constructed to be open at one side and rests on the shaft. This enables simple assembly and disassembly, the actuation lever being able to be positioned in a simple manner, optionally with slight deformation of the arms of the end region.

The actuation lever preferably has an end which is spaced apart from the pivot axis and which has a first upper curvature which forms with at least one part-region the abutment face for the core, and which has a second lower curvature which forms an abutment face for the actuation pin. The first curved abutment face ensures a defined curvature of the core, the second curvature ensures abutment of the actuation lever with the protruding end of the actuation pin of the locking device in as tangential a manner as possible.

When the actuation lever has ribs and the lateral guides of the retention member have guiding grooves and/or the actuation lever has guiding grooves and the lateral guides of the retention member have ribs which are arranged concentrically relative to the pivot axis, the movement of the actuation lever is ensured. In a particularly preferred manner, a rib is positioned on the actuation lever at the height of the contact face between the actuation lever and actuation pin. This enables at the same time a widened configuration of the actuation lever in the contact region, without the entire actuation lever having to be constructed so as to be thick.

Such a vehicle seat may, for example, be used in a passenger vehicle or a utility vehicle, wherein it does not necessarily have to be the driver's seat. Such a vehicle seat is preferably provided in a front seat row, but it may also be provided in a central or rear seat row, for example, including in a van.

FIGURES AND EMBODIMENTS OF THE INVENTION

Figure 2:
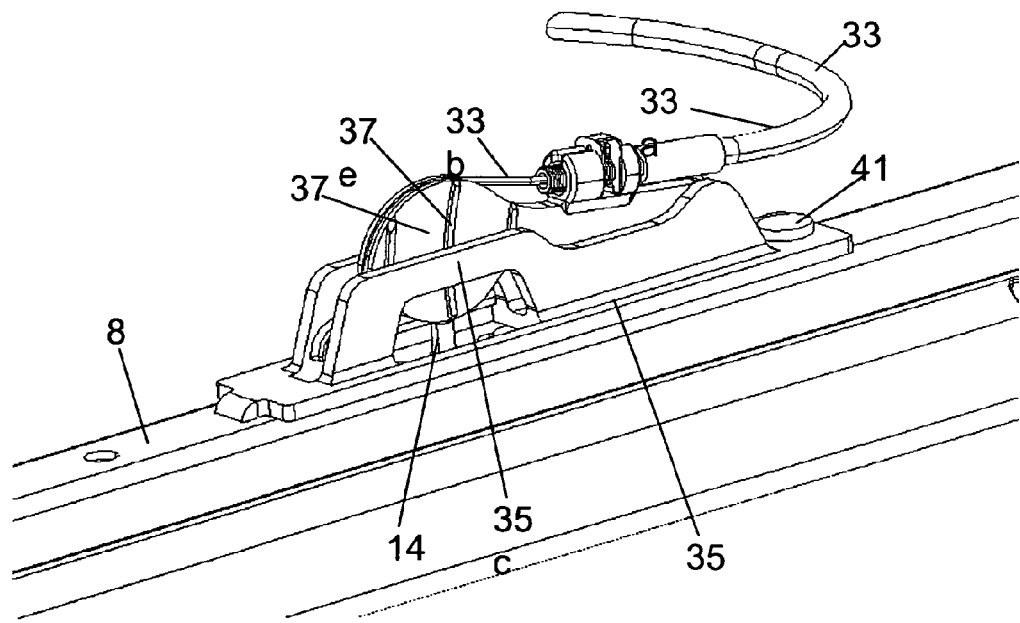
Figure 3:
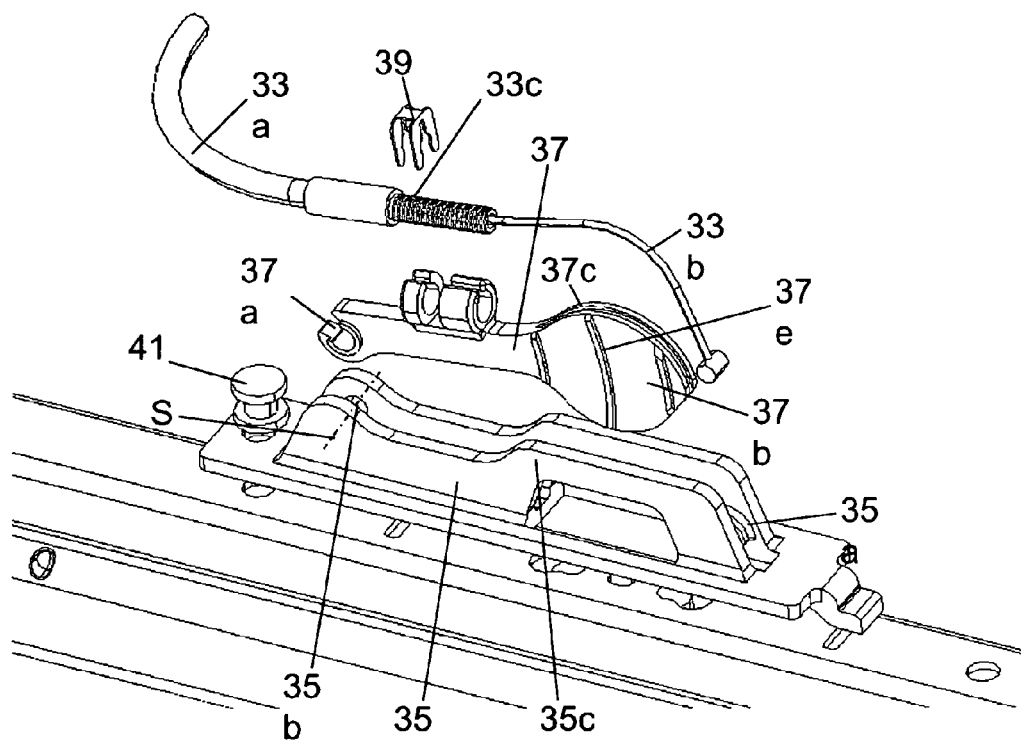
Figure 4:
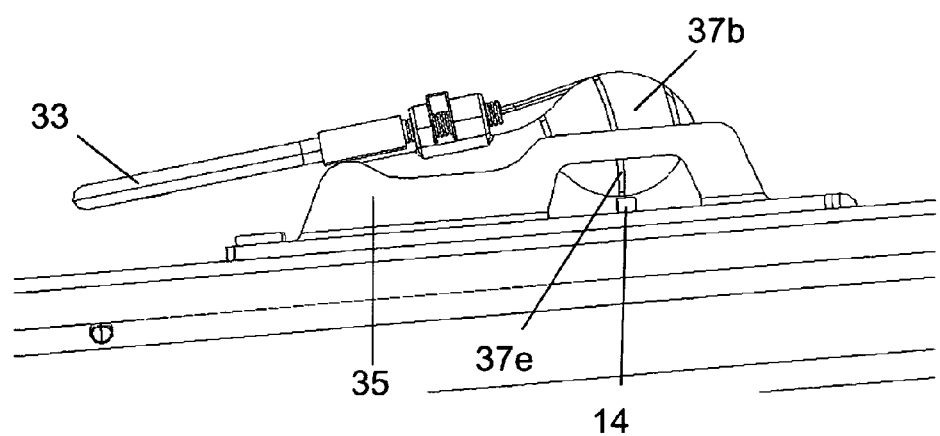
Figure 5:
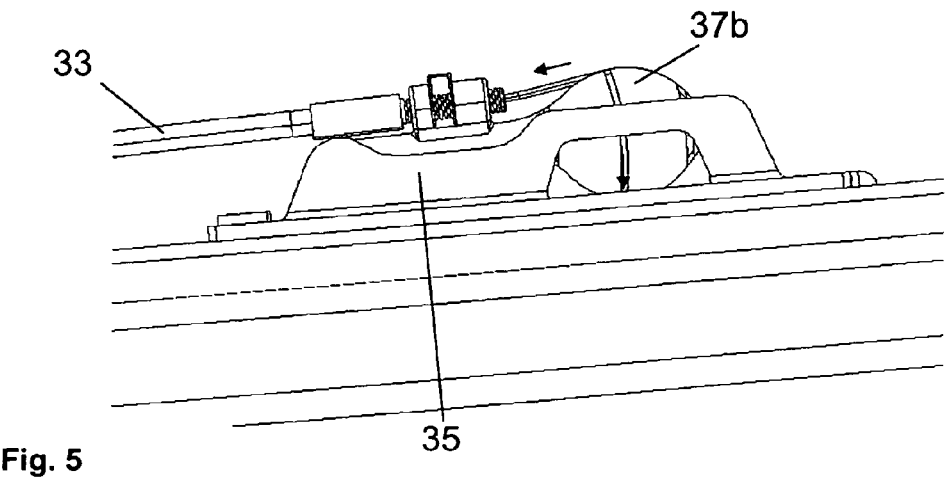
Figure 6:
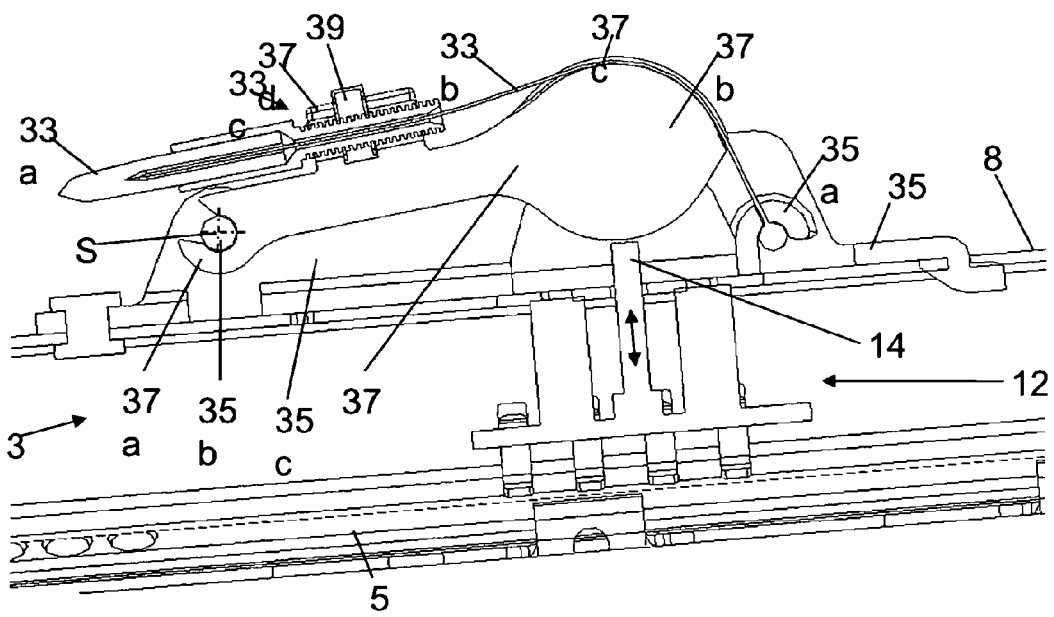
Figure 7:
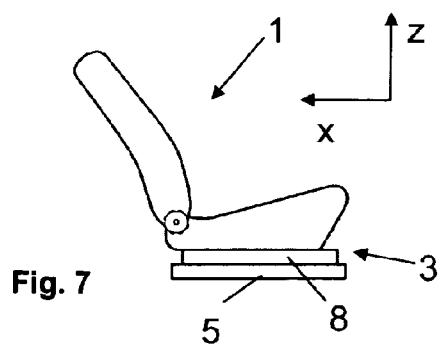

The invention is explained in greater detail below with reference to an advantageous embodiment illustrated in the drawings. However, the invention is not limited to this embodiment. In the drawings:

FIG. 1 is a perspective view of a sub-structure of a longitudinally adjustable vehicle seat, FIG. 2 is a detailed perspective view of the transfer region, FIG. 3 is an exploded perspective view of the components in the transfer region, FIG. 4 is a side view of the transfer region in the locked state, FIG. 5 is a side view of the transfer region in the unlocked state, FIG. 6 is a sectioned illustration of the transfer region in the unlocked state and FIG. 7 is a schematic side view of a vehicle seat having two seat rail pairs.

A vehicle seat 1 of a motor vehicle has a longitudinal adjuster 3, by means of which the vehicle seat 1 can be longitudinally adjusted, that is to say, the longitudinal seat position thereof can be adjusted in the longitudinal seat direction x. The longitudinal seat direction x generally extends parallel with the travel direction. The manually actuatable longitudinal adjuster 3 has at each of the two vehicle seat sides a first seat rail 5 which is connected to the vehicle structure of the motor vehicle and a second seat rail 8 which is displaceable relative to the associated first seat rail 5 in the longitudinal seat direction x and which can be locked to this first seat rail 5. In this instance, the first seat rail 5 and the second seat rail 8 engage round each other with their substantially U-shaped profile-members having inwardly or outwardly bent longitudinal edges, with ball bearings which are not illustrated in greater detail and which are arranged in ball-bearing cages being interposed.

In order to lock the first seat rail 5 and second seat rail 8, there is provided at each vehicle seat side a locking device 12, which locking devices are movably guided in the locking direction z in the second seat rail 8 and are constructed so as to cooperate with the first seat rail 5. With regard to the configuration of the locking device 12, reference is made, for example, to EP 1 227 950 B1, which has catch plates which are provided with teeth and which engage for locking in correspondingly formed catch openings in the first seat rail 5 and are pressed downward out of these catch openings in order to release the locking action. However, the only significant feature for the present embodiment is that there is provided an actuation pin 14 which protrudes through the second seat rail 8 and cooperates with the catch plates in order to release the locking action.

In order to unlock the longitudinal adjusters 3 there is provided at the front on the lower seat side a handle 31 which is fitted to the corresponding seat frame so as to be able to be pivoted about an axis which extends in the y direction. The handle 31 forms a (first) actuation device in order to unlock the locking device 12. A Bowden cable 33 having a sheath 33a and a core 33b is provided for the transmission of the handle actuation action. The end of the core 33b remote from the handle 31 is constructed in a thickened manner and is suspended in a suspension member 35a which is fixed to a rail and which is part of a retention member 35 of plastics material.

The fixing of the core end to the retention member 35 may also be carried out in a different manner, for example, by means of a curved member which retains the core and which can be folded and locked or by means of screws which protrude through an aperture which is optionally provided at the core end. The retention member 35 has a shaft 35b which extends in the transverse direction y between two side faces and which forms a pivot axis S. An actuation lever 37 is pivotably fitted to the retention member 35 on the shaft 35b.

The shaft-side end 37a of the actuation lever 37 is constructed so as to be open at one side. The other suspension-side end 37b is constructed so as to be thickened and has at the upper side a groove 37c which is constructed with a relatively large radius of curvature with respect to the transverse direction y. At the lower side, the suspension-side end 37b is also constructed with a relatively large radius of curvature, wherein it is ensured that the protruding end of the actuation pin 14 is substantially perpendicularly in abutment with the face in this region, even when the actuation lever 37 is pivoted downward and presses the actuation pin 14 downward in order to release the locking device 12.

The core 33b of the Bowden cable 33 is arranged in the groove 37c, that is to say, the groove base in this instance forms at least over a portion of the length thereof an abutment face for the core 33b, which face extends in a curved manner. The sheath 33a of the Bowden cable 33 is supported via a longitudinal compensation device 33c, as illustrated in FIG. 6, on a Bowden cable support 37d, a clip 39 which is introduced and clip-fitted into a slot of the Bowden cable support 37d securing the Bowden cable 33 to the actuation lever 37 in the region of the longitudinal compensation device 33c.

In principle, a longitudinal compensation device may also be provided at another location of the Bowden cable so that the sheath may optionally also be supported directly on the Bowden cable support 37d of the actuation lever 37. Similarly, the securing of the Bowden cable to the Bowden cable support may also be carried out in a different manner.

The pivot movement of the actuation lever 37 is guided by the side faces of the retention member 35, that is to say, the side faces form lateral guides 35c for the actuation lever 37. For additional reinforcement of the actuation lever 37, in this instance there are formed on the side faces of the actuation lever 37 in this instance ribs 37e which are arranged concentrically relative to the pivot axis and which are in abutment with the lateral guides 35c. In this instance, three ribs 37e are provided on the actuation lever 37, one at each of the ends of the thickened region of the actuation lever 37 and the central one at the height of the contact face between the actuation lever 37 and actuation pin 14, whereby the actuation lever 37 is constructed so as to be slightly wider in the contact region between the actuation lever 37 and the actuation pin 14.

Alternatively, for additional guiding, in addition to the ribs 37e which are arranged concentrically relative to the pivot axis on the side faces of the actuation lever 37, corresponding guiding grooves may be constructed in the lateral guides 35c.

Alternatively, the guides may also be constructed so as to be straight, that is to say, the ribs are omitted.

In this instance, the retention member 35 is introduced with one end into an opening which is formed in the second seat rail 8 and fixed by means of a rivet 41, which is introduced at the other end in mutually aligned openings in the retention member 35 and the second seat rail 8. However, the securing of the retention member 35 may also be carried out in any other manner, for example, by means of two rivets or screws.

In this instance, both the retention member 35 and the actuation lever 37 are constructed as plastics injection-molded components. However, they may also comprise another suitable material, such as, for example, light metal or a composite material. In particular the shaft 35b may be formed from a metal pin which is injected or subsequently inserted.

The function is as follows: if the handle 31 is actuated, there is brought about a transmission of the actuation via the Bowden cable 33 by the sheath 33a and core 33b being moved in relative terms. In this instance, the core 33b is pulled so that it is pulled into the sheath 33a with the core end being retained in the suspension member 35a of the retention member 35, whilst the sheath 33a is supported on the Bowden cable support 37d. As a result of the "shortening" of the core 33b, the actuation lever 37 is rotated about the pivot axis S and the suspension-side end 37b is pressed downward (cf. FIG. 5), wherein it presses from above on the actuation pin 14 of the locking device 12. The catch plates are thereby pressed downward and pushed out of the catch openings so that the seat rail locking action is released and the vehicle seat 1 can be displaced in the longitudinal position thereof. The travel of the core 33b over the abutment face at the outermost end of the actuation lever 37 and the arrangement of the contact face in the central region of the suspension-side end 37b of the actuation lever 37 further produces a translation of the tensile force required for the unlocking action.

If the handle 31 is released again, the sheath 33a and core 33b again move into their starting position (cf. FIG. 4) as a result of a corresponding resilient pretensioning, whereby the force on the actuation pin 14 ends and the catch plates are pulled by the force of tension springs into the catch openings between the teeth again so that the locking device 12 is locked again.

With appropriate configuration of the width of the actuation lever 37 and arrangement of the lateral guides 35c of the retention member 35, in principle the groove 37c in the actuation lever 37 may be dispensed with so that the corresponding curved side face of the actuation lever 37 can directly form the abutment face for the core 33b.

A (second) actuation device may be provided, for example, by means of additional Bowden cables, which are coupled to a forward folding action of the backrest in order to move the vehicle seat 1 completely forward in order to take up an easy-entry position. This second actuation device which is not illustrated in greater detail can also accordingly cooperate with the locking device 12. To this end, the actuation lever 37 optionally has a second groove and the retention member 35 has a second suspension 35a for receiving the core of the second Bowden cable.

As an alternative to the configuration described above, the sheath 33a of the Bowden cable 33 may also be secured to a support on the retention member 35.

In principle, a single-piece configuration of the second seat rail with the retention member is also conceivable, for which purpose the seat rail has corresponding lateral guides, for example, formed by raised material regions together with a shaft which supports the actuation lever and a suspension for the core end.

By means of a sufficiently high shape of the lateral guides 35c of the retention member 35, there may further be produced a kick prevention system which prevents the unlocking system from becoming actuated or damaged.

The features disclosed in the above description, claims and drawings may be significant for the implementation of the invention both individually and together in the various embodiments thereof.

LIST OF REFERENCE NUMERALS

1 Vehicle seat
3 Longitudinal adjuster
5 First seat rail
8 Second seat rail
12 Locking device
14 Actuation pin
31 Handle
33 Bowden cable
33a Sheath
33b Core
33c Longitudinal compensation device
35 Retention member
35a Suspension member
35b Shaft
35c Lateral guide
37 Actuation lever
37a Shaft-side end
37b Suspension-side end
37c Groove
37d Bowden cable support
37e Rib
39 Clip
41 Rivet
S Pivot axis
x x direction, longitudinal seat direction
y y direction, transverse direction
z z direction, locking direction

The invention claimed is:
1. A vehicle seat comprising:
a longitudinal adjuster;
a seat rail pair having a first seat rail which is secured to a structure, a second seat rail which is guided in this first seat rail in the longitudinal direction of the seat and which is connected to the vehicle seat;
a releasable locking device having at least one actuation pin which protrudes at least in one position beyond the second seat rail;
a pivotably arranged actuation lever;
a Bowden cable having a sheath and a core;
a retention member which is secured to a rail and which supports the actuation lever at one end so as to be able to be pivoted about a pivot axis; and
an abutment face, formed on the actuation lever, with which the core of the Bowden cable is in abutment in a part-region between the end of the sheath and the end of the core, wherein the retention member which is secured to a rail secures the end of the core of the Bowden cable, and the actuation lever has a Bowden cable support, on which the sheath of the Bowden cable is directly or indirectly supported, wherein the actuation lever has an end which is spaced apart from the pivot axis and which has a first upper curvature, which forms with at least one part-region of the abutment face for the core and which has a second lower curvature which forms an abutment face for the actuation pin.

2. The vehicle seat as claimed in claim 1, wherein the retention member and/or the actuation lever is/are formed by a plastics component.

3. The vehicle seat as claimed in claim 1, wherein the abutment face of the actuation lever is formed by a groove.

4. The vehicle seat as claimed in claim 1 wherein there is provided on the Bowden cable a longitudinal compensation device, which is arranged between the sheath and the Bowden cable support of the actuation lever.

5. The vehicle seat as claimed in claim 1, wherein the Bowden cable can be fitted to the actuation lever by a clip.

6. The vehicle seat as claimed in claim 1, wherein the retention member has two lateral guides in relation to which the actuation lever is positioned and in relation to which it can be moved in a relative manner by being pivoted about the pivot axis.

7. The vehicle seat as claimed in claim 1, wherein the actuation lever is pivotably supported on a shaft which is provided on the retention member.

8. The vehicle seat as claimed in claim 7, wherein a shaft-side end of the actuation lever is constructed to be open at one side and rests on the shaft.

9. The vehicle seat as claimed in claim 1 wherein the actuation lever has at least one lateral rib.

* * * * *